Aug. 25, 1964    J. M. BAROSKO    3,145,859
JACK

Filed July 18, 1961

INVENTOR.
John M. Barosko.
BY
Harness, Dickey & Pierce
ATTORNEYS.

Aug. 25, 1964     J. M. BAROSKO     3,145,859
JACK
Filed July 18, 1961     3 Sheets-Sheet 2
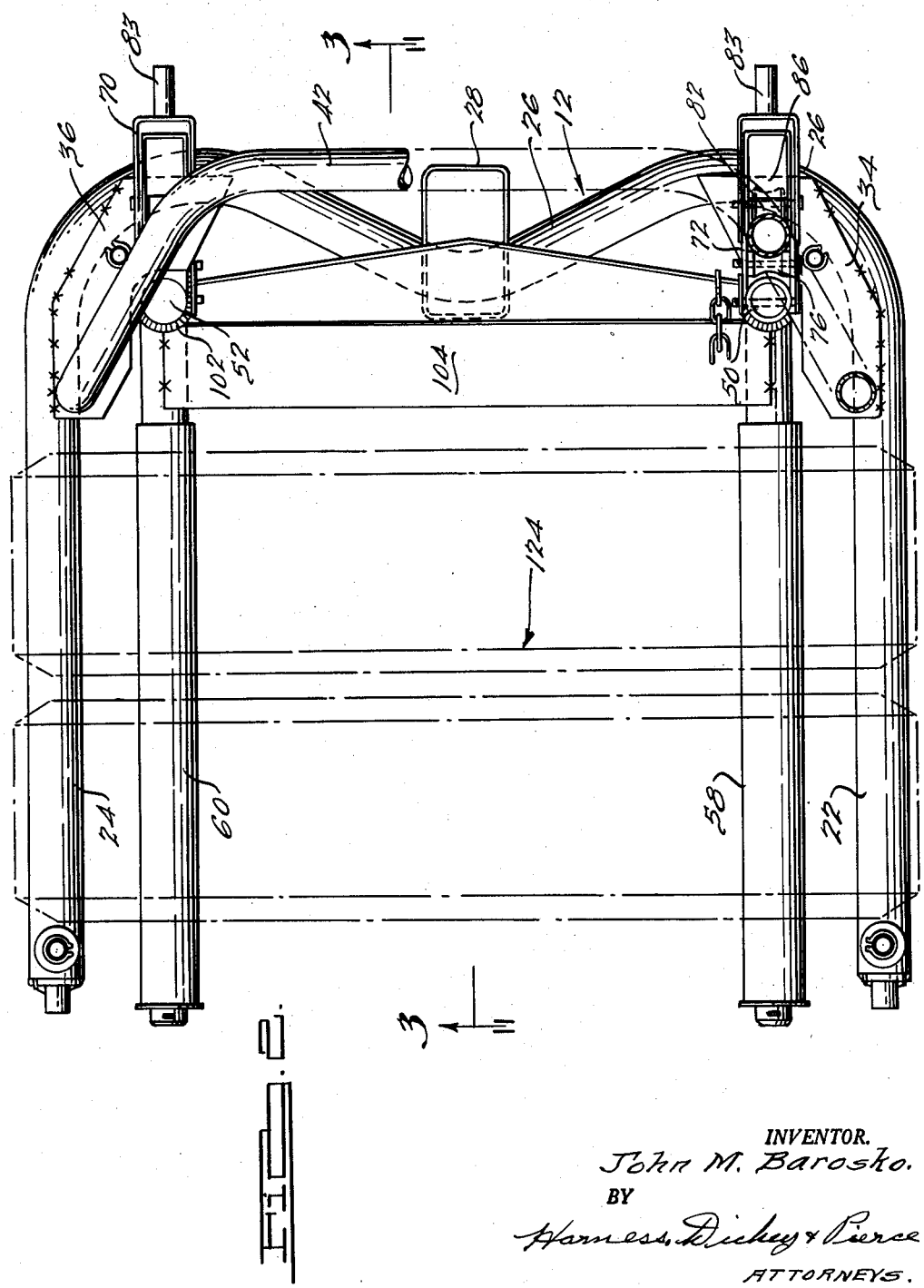
INVENTOR.
John M. Barosko.
BY
Harness, Dickey & Pierce
ATTORNEYS.

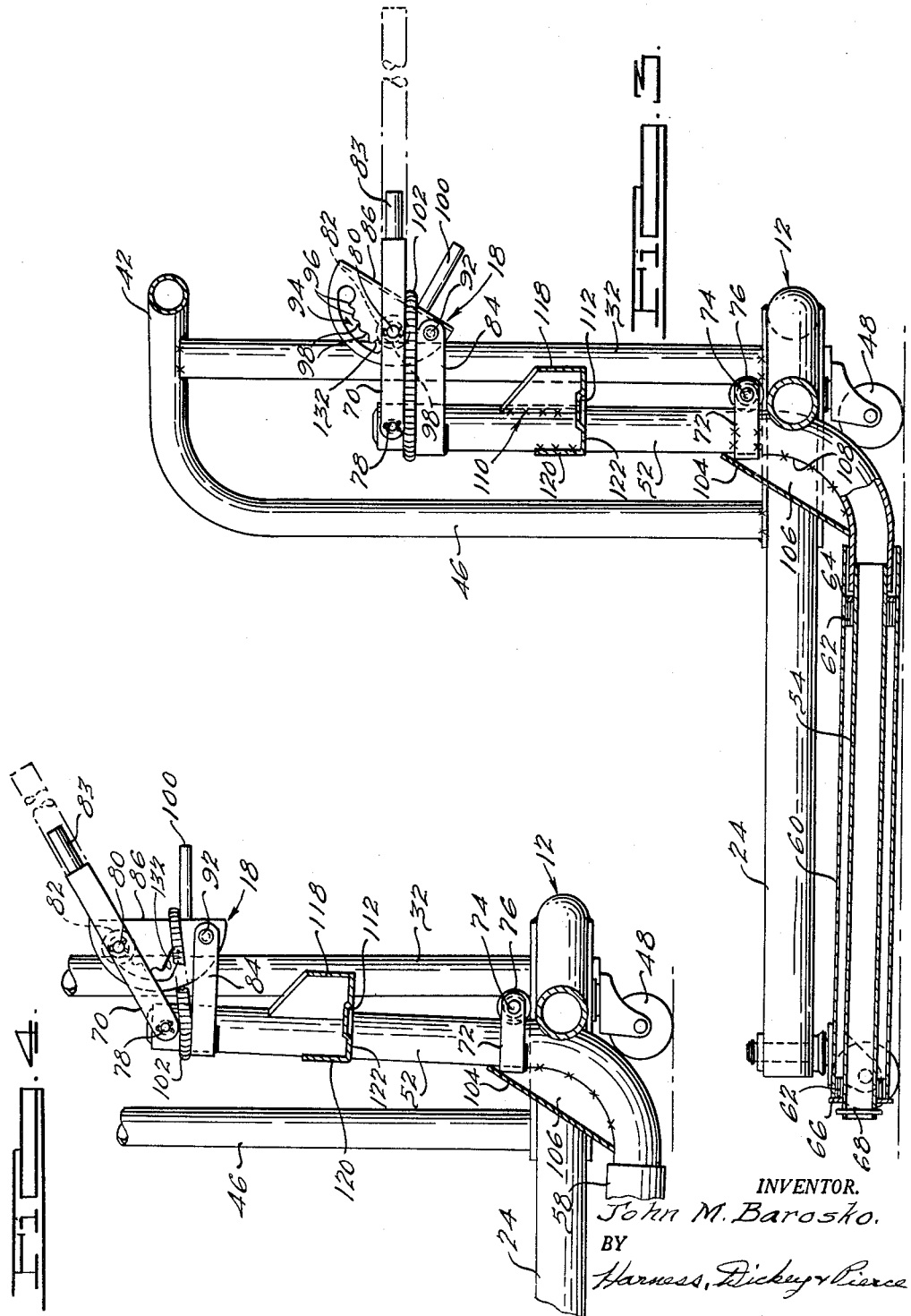

United States Patent Office 3,145,859
Patented Aug. 25, 1964

3,145,859
JACK
John M. Barosko, Kenosha, Wis., assignor to Walker Manufacturing Company, Racine, Wis., a corporation of Delaware
Filed July 18, 1961, Ser. No. 124,882
10 Claims. (Cl. 214—331)

This invention relates to improved truck or dolly type apparatus generally used to pick up and transport heavy objects particularly in manufacturing and assembly plants and in repair shops of various types, and is particularly suited for picking up and moving around heavy wheel and tire assemblies and properly positioning them for securement onto the axles and hubs of vehicles, or over the brake shoes thereof if the hub and brake drum have been previously secured to the wheel. This apparatus is also useful for removing these wheel and tire assemblies from said vehicles.

In removing and assembling heavy wheel and tire assemblies of the type used on trucks and other large vehicles by means of conventional dollies and the like, it is difficult to manipulate these assemblies so that the wheel hub studs or apertures are aligned properly with the studs or bolt holes in the wheels, particularly when the wheel and tire assemblies are heavy and cause flexing of the load-supporting parts of the dolly and when the vehicle body and the dolly are not supported on substantially the same plane.

Heretofore, various types of dollies have been employed for positioning these heavy wheels with respect to the hubs for securement thereto; however, they have generally provided adjustment with respect to the wheel hub in only a limited manner such as in the vertical and horizontal planes and rotatively with respect to the hub. Some dollies have also provided tilting adjustments, but, these adjustments have generally required excessive and complex structure which is difficult to effectively use.

Applicant's dolly allows for adjusting the position of the wheel and tire assemblies in all directions with respect to the wheel hub, axle, and brake shoes so that tugging and pulling of the wheels is not required in order to properly position the wheel with respect thereto particularly when the aforesaid variation in the surfaces upon which the vehicle and dolly are positioned occurs and/or when the weight of the wheel and tire cause excessive flexing of the supporting parts of the dolly. Without this adjustable motion in all directions as provided by applicant's dolly structure, the possibility of damaged oil seals and brake shoes caused by forcing the wheels into alignment with the hubs is increased. Moreover, binding of the wheels on the studs of the hub can readily occur in using the conventional wheel supporting dollies which binding necessitates tugging and pulling of the wheel with damage to the studs and to the oil seals and brake shoes.

It is a principal object of applicant's invention therefore, to provide a dolly for supporting heavy loads such as wheel and tire assemblies and having easily operable means for adjusting the position of these loads in all directions with respect to the structure upon which these loads are to be precisely assembled.

A specific object is to provide means on a dolly for supporting heavy wheel and tire assemblies which allows the asemblies in their supported positions to be moved vertically and horizontally, tilted forward and back and from side-to-side selectively as required, as well as allowing these assemblies to be rotated substantially about their axis so as to properly position them on the wheel hub.

A further object is to provide the above dolly with means for maintaining the selected tilted position of the load during the assembly thereof to the wheel hub.

A further object is to provide the above universal type of adjustment dolly with such a contsruction and handle means so positioned thereon for operation by the operator that the wheel asemblies and wheel hub studs or bolt holes are easily accessible when the dolly and wheels are in their proper position with respect to the wheel hub.

A further specific object is to provide an improved connection between the wheel engaging portions of the dolly for allowing relative pivotal motion to occur between these portions while preventing any substantial spreading apart thereof.

Further objects and advantages of the present invention will become apparent from the following description and drawings in which:

FIGURE 2 is a top elevation of the dolly of FIGURE 1;

FIGURE 3 is a view of the dolly of FIGURE 1 taken along the line corresponding to 3—3 thereof in the direction of the arrows; and FIGURE 4 is a partial view of the structure of FIGURE 3 showing the dolly in its rearwardly tilted position.

Figure 1:
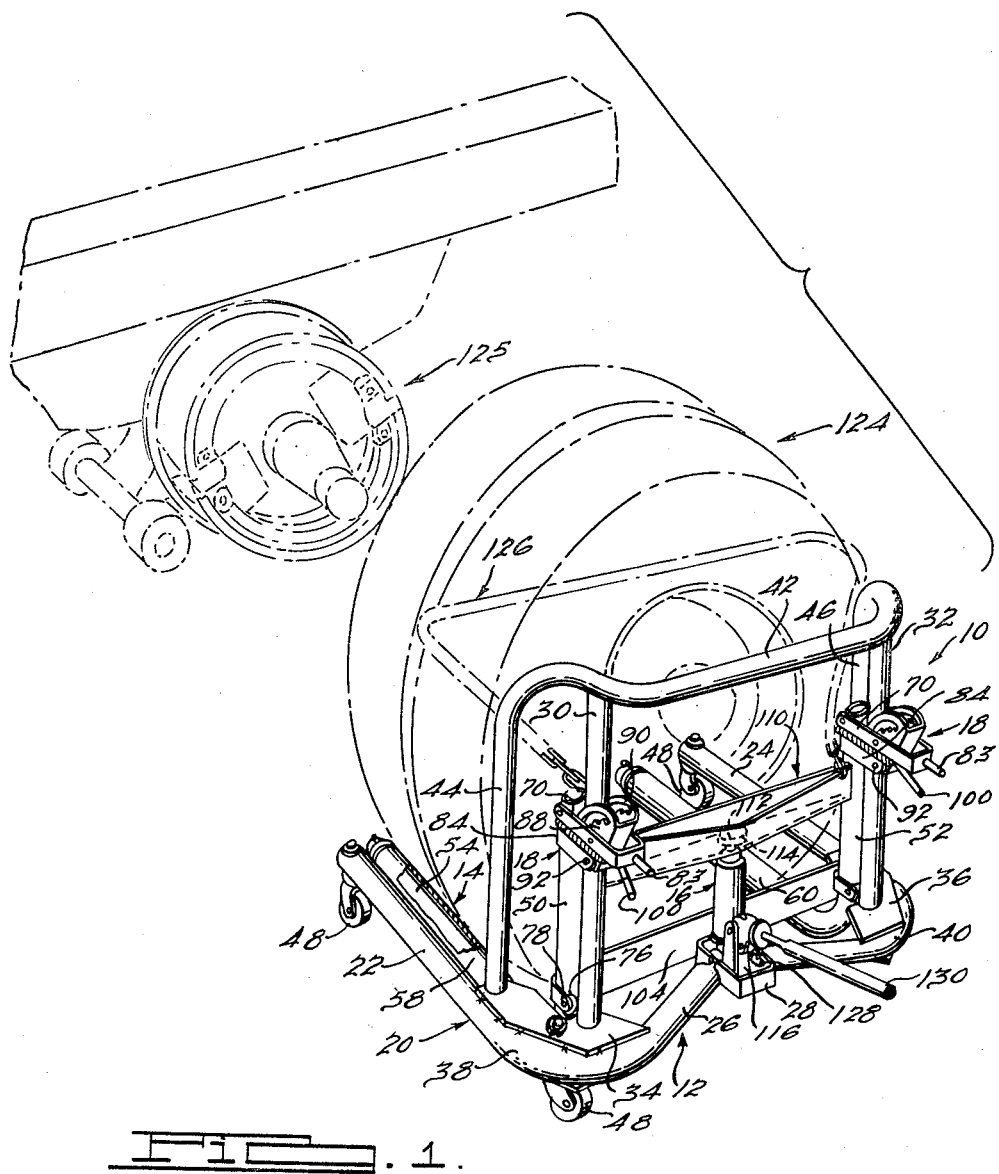
FIGURE 1 represents an isometric view of the dolly of the present invention with portions of a wheel and tire assembly and a vehicle axle and brake assembly shown in phantom.

Referring to the drawings, the dolly or truck generally designated 10 comprises a base or frame generally indicated 12, a load supporting means generally designated 14, power means generally indicated 16, and a pair of retaining means 18 for maintaining the adjusted tilted position of the load supporting means 14. The base or frame 12 conveniently comprises a relatively lightweight tubular member generally designated 20 and formed to provide a pair of spaced generally horizontal beams 22 and 24 and a connecting or intermediate portion 26 which is provided with a socket or box-shaped member 28 for supporting a power device such as a hydraulic jack 16. Base 12 further comprises a pair of spaced generally vertical guides or rails 30 and 32 which are welded or otherwise secured to plates 34 and 36 respectively, secured to corner portions 38 and 40 of member 20. Rails 30 and 32 are welded at their tops to a handle bar 42 which is provided with a pair of downwardly extending legs 44 and 46 secured respectively to the plates 34 and 36. It is noted that these plates impart considerable rigidity to the frame 12. Casters 48 may be provided adjacent the ends of beams 22 and 24 and at the corners 38 and 40 of member 20. It is noted, however, that any number of casters wherever desired may be employed in order to provide the required mobility of the dolly. These casters, moreover, may be of any well known construction and may have rubber or metal wheels depending on the operational requirements.

The load supporting means 14 comprises a pair of substantially vertically directed spaced bearing support members 50 and 52 which are formed to provide generally horizontal load bearing arms 54 and 56 extending outwardly from the portions 50 and 52 between the beams 22 and 24. Arms 54 and 56 are covered over substantially their entire length by tubular load engaging arms 58 and 60 respectively, which are spaced from arms 54 and 56 by bearings or bushings preferably of the Oilite type indicated as 62, which bushings are conveniently secured to the arms 58 and 60. Arms 58 and 60 are conveniently longitudinally positioned and held on the arms 54 and 56 by means of washers 64 secured to arms 54 and 56 and washers 66 held onto arms 54 and 56 by cotter pins 68.

In connecting the load supporting means 14 to frame 12 a pair of upper and lower movable yokes 70 and 72 respectively, are secured to each of the bearing supports 50 and 52. Each yoke 72 is secured to its bearing support preferably by welding and carries a shaft 74 between its legs rotatably supporting a roller 76 having a groove 78 therein bearing against its adjacent guide or rail 30 or 32. The ends of the legs of each of the upper yokes 70 are pivoted by means of pins 78 to their associated support 50 and 52 and each carries a bearing pin 80 between its legs at the rearward portions thereof which rotatably supports a roller 82 similar to rollers 76 and which bears against the opposite side of the associated guide 30 or 32. Each yoke 70 is further provided at its rearward end with a handle 83 for moving the rollers 82 up and down along the guides 30, 32 for a purpose described below. A persuader rod is shown in phantom on the end of handle 83 should additional leverage be required.

A fixed yoke 84 is provided on each of the bearing support members 50 and 52 and each supports one of the retaining means 18 between the rearward portions of its legs. Each of these retaining means 18 comprises a semicircular latch plate in the form of base portion 86 and a pair of wall portions 88 and 90 (FIGURE 1) integral therewith and extending therefrom to provide a substantially channel-shaped member fitted inside yokes 70 and 84. A pin 92 extends through the legs of each yoke 84 and through each of the walls 88 and 90 of the retaining means 18 adjacent an end thereof and is of a diameter to pivotally mount the retaining means on the yoke and allow the same to be pivoted arcwise about pin 92 to the right and left as shown in FIGURE 3. One or both of the wall ports 88 and 90 is provided with slot means generally indicated 94 and formed to provide a plurality of projections 96 and recesses 98. It is noted that the bearing pins 80 which support the upper rollers 82 extend through the slot means 94 in the walls of each retaining means 18, and the upper rollers 82 are nested between the walls or ratchet plates 88 and 90 thereof. These various parts of each retaining means 18 are so spaced with respect to each other and the rollers 82 that the rollers 82 are free to rotate on their pins 80 without interference with the retaining means 18 which are free to pivot on their pivot pins 92 when it is desired to make a tilting adjustment. Handles 100 are welded to the bottoms 86 of the retaining means 18 and a coil spring 102 is looped around each retaining means and its associated bearing support for purposes hereinafter described.

The bearing supports 50 and 52 are secured together by a connecting member 104 provided at each end with a flange 106 welded as at 108 to the adjacent bearing support 50 or 52. It is noted that this connecting member 104 can readily flex to allow relative pivotal motion of the bearing supports 50 and 52 generally in the plane of FIGURE 3, but, will not flex to allow any substantial spreading motion of the load supporting arms 54 and 56 generally in the plane of FIGURE 2.

A substantially boat-shaped member generally indicated 110 is welded at its ends to the supports 50 and 52 and is provided substantially at its center portion with an indent or socket 112 for receiving the head of a plunger 114 of a hydraulic jack of other power means 16, the base 116 of which is conveniently nested in the box 28. This power device may be of any conventional hydraulic jack structure and the capacity thereof may readily be selected for a particular job. The socket 112 and the box 28 are made sufficiently large to accommodate a wide variety of hydraulic or other types of jacks such as ratchet types conventionally used to jack up automobiles. It is noted that the side walls 118 and 120 and the bottom 122 of the member 110 provides a convenient receptacle for tools, bolts, nuts and other elements required for the particular job.

In the operation of the dolly with reference to the positioning of a heavy wheel and tire assembly relative to a vehicle axle and brake assembly, the dolly is grasped by the handle bar 42 and is moved toward the upstanding wheel and tire assembly, generally indicated 124, to position the load engaging members 58 and 60 underneath either side of said assembly. The jack 16 during this operation is in its retracted position with the members 58 and 60 in their lowered position which may be just about touching the floor surface. When assembly 124 is in the position shown in FIGURE 2, the retaining means 18 may conveniently be in their positions shown in FIGURE 3 wherein the members 58 and 60 are substantially horizontal to the floor surface. When it is desired to lift the assembly 124, a holding device such as a chain generally indicated 126 and connected preferably to the rear wall 118 of member 110 as shown in FIGURE 1 for accessibility, is looped over one or both of the wheels of the assembly 124 to hold it in a substantially upright position on the engaging members 58 and 60. The jack 16, if it be a hydraulic jack, may then be actuated by closing the bleed valve 128 and pumping the handle 130 to extend the plunger 114 and raise the supporting means 14 and the assembly 124 upwardly with respect to the base 12. It is noted that during this lifting operation of the wheel assemblies, the rollers 76 and 82 readily roll along upper and lower parts of opposite sides of the guides 30 and 32, and the retaining means 18 are carried along with the bearing supports 50 and 52. The dolly and assembly 124 are then moved into position with respect to the vehicle axle and wheel hub or brake unit generally indicated 125 and the hydraulic jack is then operated up or down to adjust the height of the wheels to substantially align them with the axle hub or brake. The wheel and tire assembly may then be rotated on the rotatable members 58 and 60 by loosening the chain 126 or completely removing the same from the wheels to further aid in aligning the apertures in the wheels with the connecting studs on the hub or vice versa.

At this point in the assembly procedure it often occurs that the assembly 124 is not in a vertical plane which is substantially parallel to the plane of the wheel hub, and it is impossible to merely move the dolly toward the hub and thereby insert the connecting studs precisely into the apertures in the wheel. In order to tilt the wheel assembly, both or one of the upper rollers 82 may be moved upwardly along its respective guides 30 or 32 by pulling upwardly on the handle 83 of the yoke 70. This pulls the tops of supports 50 and 52 toward the rails 30 and 32 and therefore pivots the wheel support 14 about the axes of rollers 76. If both handles 83 are pulled upwardly, the yokes 70 are pivoted upwardly around their pivot points 78, the bearing pins 80 supporting the upper rollers 82 will ride upwardly along the surface 132 of the slot means 94 to cam each retaining means 18 in a counterclockwise position around its pivot 92 which itself is moving away from rail 32. The spring 102 constantly urges the serrated surface of the ratchet plate in a direction to maintain the pins 80 in contact with the surfaces of the slot means 94 at all times and therefore hold the yoke 70 in a desired angular position. As the pin 80 is moved upwardly along the surface 132, it will progressively drop into the grooves 98 as the pin 80 is moved further and further away from the pin 92. As the pin 80 is thus progressively moved away from pin 92, the upper portion of the bearing supports 50 and 52 will swing in a clockwise manner about the lower rollers 76 to thereby swing the arms 54, 56, 58, and 60 upwardly in a clockwise arcwise motion as shown in FIGURE 4. If this adjustment of the upper rollers 82 is individually made, then it is obvious that one side of the wheel and tire assembly 124 will be moved upwardly while the other side is maintained substantially stationary, while if both upper rollers 82 are simultaneously adjusted, the entire assembly 124 will be tilted rearwardly with respect to the base 12. Forward or counterclockwise tilting motion of the arms 54, 56, 58, and 60 is generally not required since the weight of the assembly 124 will automatically flex these arms downwardly in a counterclockwise motion as viewed in FIGURE 3, and the adjustment of the upper rollers 82, therefore, will tilt the wheel assemblies from a naturally forwardly tilted position to a plane parallel with the plane of the wheel hub and brake assembly. It is noted that the pins 80 and 92 are substantially in vertical alignment or an over center position at all times throughout the full range of adjustments of the retaining means 18 so that the couple tending to pivot support 14 in a counterclockwise position will not unlatch the pin 92 from the retaining means 18. When it is deisred to tilt back the support 14 and therefore to move the rollers 82 downwardly along the guides 30 and 32, the handles 83 are pulled upwardly while simultaneously pushing handles 100 of the retaining means downwardly so that the pin 92 can clear the grooves in the retainer 18.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A truck device for supporting a load and adapted for adjusting the position of the supported load, comprising a base having guide means thereon, load supporting means having first leg portions extending outwardly from said guide means and having other leg portions extending generally in the same direction as said guide means, anti-friction means movably mounting said other leg portions on said guide means, said anti-friction means being individually adjustably mounted to individually vary the distance between said other leg portions and said guide means to thereby independently adjust the position of each of said first leg portions relative to said base, and releasable retaining means for positively maintaining said anti-friction means in its adjusted position, said releasable retaining means comprising members movably mounted on said other leg portions, elements movable with said anti-friction means and engageable with said members, the surface contours of the engaging portions of said members and elements being such as to permit relative movement in a direction which reduces the distance between said other leg portions and said guide means but prevent relative movement in the opposite direction, and means for individually moving said members to separate them from said elements thereby permitting said relative movement in the opposite direction.

2. A truck device for supporting a load and adapted for adjusting the position of the supported load, comprising a base having guide means extending generally upwardly therefrom, load supporting means having first leg portions extending outwardly from said guide means and having other leg portions extending generally in the same direction as said guide means, anti-friction means movably mounting said other leg portions on said guide means, said anti-friction means being individually adjustably mounted to individually vary the distance between said other leg portions and said guide means to independently adjust the position of each of said first leg means relative to said base, means for independently mechanically locking each of said anti-friction means in its adjusted position, said locking means comprising members movably mounted on said other leg portions, elements movable with said anti-friction means and engageable with said members, the surface contours of the engaging portions of said members and elements being such as to permit relative movement in a direction which reduces the distance between said other leg portions and said guide means but prevent relative movement in the opposite direction, means for individually moving said members to separate them from said elements thereby permitting said relative movement in the opposite direction, and power means engaging said base and said load supporting means for further adjusting the position of said base and said load engaging means.

3. A truck device for supporting a load and adapted for adjusting the position of the supported load, comprising a base having guide means extending generally upwardly therefrom, load supporting means having first leg portions extending outwardly from said guide means and having other leg portions extending generally axially of said guide means and spaced therefrom, said first and other leg portions being rigidly connected together, and a plurality of roller means mounting said other leg portions on said guide means for allowing substantially axial and lateral adjustments of said other leg portions relative to said guide means, some of said roller means being pivotally mounted on said other leg portions to provide said lateral adjustments, said pivotal mounting comprising a yoke for each pivotally mounted roller means, said yoke being pivoted at one end to its respective leg portion and rotatably carrying said roller means at the other end.

4. A truck device for supporting a load and adapted for adjusting the position of the supported load relative to other structure to which said load is to be assembled, comprising a base having guide means extending generally upwardly therefrom, load bearing means having first leg portions extending generally transversely to said guide means and having other leg portions extending generally axially of said guide means, anti-friction means movably mounting said other leg portions on said rail means, said anti-friction means being individually movable on said guide means to allow individual and independent axial and lateral movement of said other leg portions relative to said guide means to pivot said other leg portions and move said first leg portions vertically and angularly relative to said base, and releasable retaining means for positively maintaining said anti-friction means in its adjusted position, said releasable retaining means comprising members movably mounted on said other leg portions, elements movable with said anti-friction means and engageable with said members, the surface contours of the engaging portions of said members and elements being such as to permit relative movement in a direction which reduces the distance between said other leg portions and said guide means but prevent relative movement in the opposite direction, and means for individually moving said members to separate them from said elements thereby permitting said relative movement in the opposite direction, and flexible connecting means secured to said load bearing means for substantially preventing spreading apart of said first leg portions while allowing relative motion therebetween in other directions.

5. A dolly device for supporting a load and adapted for adjusting the position of the supported load relative to structure adapted for receiving said load, comprising a base having a pair of spaced rails extending upwardly therefrom and further having a pair of spaced beams extending substantially transversely to said rails, load supporting means having a first pair of legs positioned between said beams and extending generally transversely to said rails and further having another pair of legs extending generally in the same direction as said rails, a pair of upper and lower bearings connected to each said another leg and movably mounting the same on one each of said rails, means for separately and selectively adjusting the position of each of said upper bearings on its associated rail and on its leg to selectively vary the distance between each of said another legs and its associated rail by pivoting said load supporting means about said lower bearings relative to said base, releasable retaining means for positively maintaining each individual upper bearing in its adjusted position, said releasable retaining means comprising members movably mounted on said other pair of legs, element movable with said upper bearings and engageable with said members, the surface contours of the engaging portions of said members and elements being such as to permit relative movement in a direction which reduces the distance between said other legs and said rails but prevent relative movement in the opposite direction, means for individually moving said members to separate them from said elements thereby permitting said relative movement in the opposite direction, and connecting means on said load supporting means for substantially preventing the spreading apart of said first legs while allowing relative motion therebetween in other directions.

6. A dolly device for supporting a load and adapted for adjusting the position of the supported load relative to structure adapted for receiving said load, comprising a base having a pair of spaced rails extending upwardly therefrom and further having a pair of spaced beams extending substantially transversely to said rails, load supporting means having a first pair of legs positioned between said beams and extending generally transversely to said rails and further having another pair of legs extending generally in the same direction as said rails, a pair of upper and lower bearings connected to each said another leg and movably mounting the same on one each of said rails, means for separately and selectively adjusting the position of each of said upper bearings on its associated rail and on its leg to selectively vary the distance between each of said another legs and its associated rail by pivoting said load supporting means about said lower bearings relative to said base, means for mechanically and positively locking each individual upper bearing in its adjusted position, said locking means comprising members movably mounted on said other pair of legs, elements movable with said upper bearings and engageable with said members, the surface contours of the engaging portions of said members and elements being such as to permit relative movement in a direction which reduces the distance between said other legs and said rails but prevent relative movement in the opposite direction, means for individually moving said members to separate them from said elements thereby permitting said relative movement in the opposite direction, connecting means on said load supporting means for substantially preventing the spreading apart of said first legs while allowing relative motion therebetween in other directions, and power means engaging said base and said load supporting means for lifting said load supporting means and the load supported thereby.

7. A truck device for supporting a load and adapted for adjusting the position of the supported load relative to structure adapted for receiving said load, comprising a base having spaced rail means extending upwardly therefrom, load supporting means having first leg portions extending generally transversely to said rail means and further having other leg portions extending generally in the same direction as said rail means, anti-friction means movably mounting said other leg portions on said rail means, means for adjusting the position of said anti-friction means on said rail means to vary the distance between portions of said other leg portions and said rail means to pivot said load supporting means relative to said base, said means comprising yokes pivoted to said other leg portions, extending past said rails and carrying said anti-friction means, and releasable retaining means for positively maintaining said anti-friction means in its adjusted position.

8. A truck device for supporting a load and adapted for adjusting the position of the supported load with respect to structural means adapted for receiving said load, comprising a base having spaced guide means thereon, load supporting means having spaced first legs extending outwardly from said guide means and having spaced other legs extending generally in the same direction as said guide means, a plurality of spaced bearing means on each of said other legs and movably mounting the same on separate ones of said guide means, at least one of said bearing means on each of said other legs being movably mounted thereon and on its associated guide means independently of the other bearing means thereon for varying the distance between portions of each of said other legs and its associated guide means, and ratchet means on each of said other legs for engaging said ones of said bearing means for retaining the same in their adjusted position on said guide means, said ratchet means being movably mounted on said other legs and having teeth successively engageable by said ones of said bearing means, the positions of said teeth being such that the bearing means will be positively retained in their adjusted positions.

9. A truck device for supporting a load and adapted for adjusting the position of the supported load with respect to structural means adapted for receiving said load, comprising a base having spaced guide means thereon, load supporting means having spaced first legs extending outwardly from said guide means and having spaced other legs extending generally in the same direction as said guide means, a plurality of spaced bearing means on each of said other legs and movably mounting the same on separate ones of said guide means, at least one of said bearing means on each of said other legs being movably mounted thereon and on its associated guide means independently of the other bearing means thereon for varying the distance between portions of each of said other legs and its associated guide means, and ratchet means on each of said other legs for engaging said ones of said bearing means for retaining the same in their adjusted position on said guide means, said ratchet means being movably mounted on said other legs and having teeth successively engageable by said ones of said bearing means, the positions of said teeth being such that the bearing means will be positively retained in their adjusted positions, each of said one bearing means allowing its associated other leg to be adjusted relative to its associated guide means independently of the other of said other legs.

10. A truck device for supporting a load and adapted for adjusting the position of the supported load with respect to structural means adapted for receiving said load, comprising a base having spaced guide means thereon, load supporting means having spaced first legs extending outwardly from said guide means and having spaced other legs extending generally in the same direction as said guide means, a plurality of spaced bearing means on each of said other legs and movably mounting the same on separate ones of said guide means, at least one of said bearing means on each of said other legs being movably mounted thereon and on its associated guide means independently of the other bearing means thereon by means of a yoke pivoted to each of said other legs and carrying said one bearing means for varying the distance between portions of each of said other legs and its associated guide means, and releasable ratchet means on each of said other legs and resiliently urged into engagement with said ones of said bearing means for retaining the same in their adjusted position on said guide means, said ratchet means being movably mounted on said other legs and having teeth successively engageable by said ones of said bearing means, the positions of said teeth being such that the bearing means will be positively retained in their adjusted positions.

References Cited in the file of this patent
UNITED STATES PATENTS 2,467,500    Salter                  Apr. 19, 1949
2,490,233    Schildmeier            Dec. 6, 1949